Nov. 14, 1961 P. SAMMARCO 3,008,219
METHOD OF ASSEMBLING TIRE CARCASS ROLLS
AND ROLL MADE BY THE PROCESS
Filed July 30, 1958 3 Sheets-Sheet 1

INVENTOR
Peter Sammarco
ATTORNEY

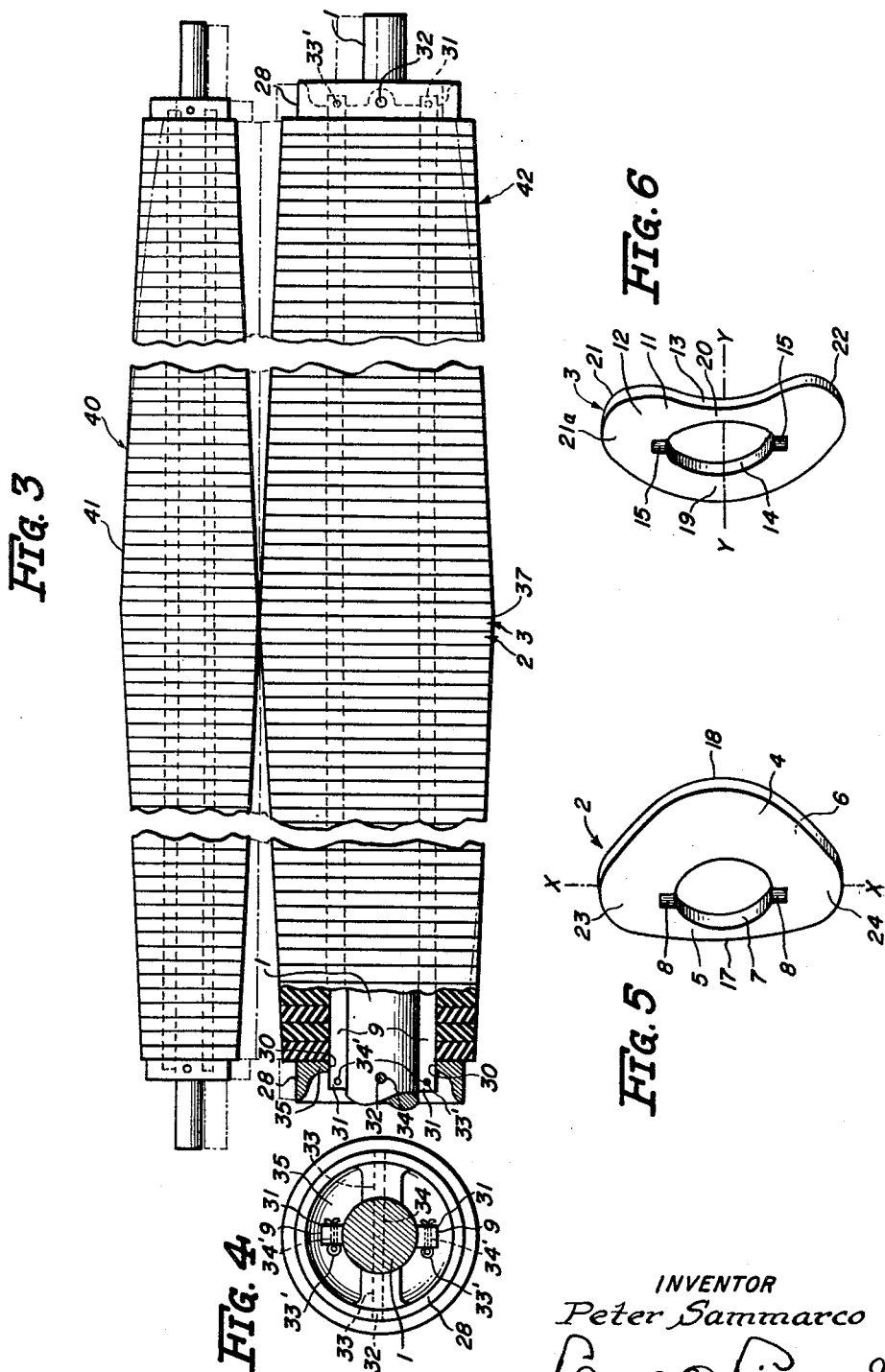

INVENTOR
Peter Sammarco
Paul O. Pippel
ATTORNEY

United States Patent Office 3,008,219
Patented Nov. 14, 1961

3,008,219
METHOD OF ASSEMBLING TIRE CARCASS ROLLS AND ROLL MADE BY THE PROCESS
Peter Sammarco, Bellwood, Ill., assignor to International Harvester Company, Chicago, Ill., a corporation of New Jersey
Filed July 30, 1958, Ser. No. 752,078
3 Claims. (Cl. 29—125)

This invention relates to tire carcass rolls of the type which comprise a series of disks stacked together on a shaft and held under compression thereon.

A general object of the invention is to provide a novel, inexpensive and durable roll which is made of tire carcass disks.

Rolls made of tire carcass and particularly those which are subjected to heavy loadings must be made with the disks compressed substantially uniformly about the circumference of the roll. The disks which are used in such rolls, being made of tire carcass, are curved in their static condition. The assembly of such disks on a shaft has heretofore been accomplished by cupping the disks together and then compressing the entire stack in order to straighten out the disks and hold them in contact with each other. I have found that this method of assembling is entirely unsatisfactory, especially for rolls which are used under loads such as crushing rolls. The effect in cupping all of the disks produces uneven pressure distribution around the periphery of the roll in that where the disks contact each other the pressures are extremely high and in between the contact points the pressures diminish so that there are actual voids between adjacent disks. In the use of such rolls for crushing I have found that these variations in compression and the presence of voids between the adjacent disks developed flexing of these portions of the disks to such an extent that friction heat developed and destroyed the roll by burning.

It is a primary object of the invention to provide a method of making a tire carcass disk roll which is entirely free of the defects heretofore mentioned.

More specifically, the invention contemplates a novel method of assembling the disks on the center shaft with alternate disks being disposed with their axes of curvature substantially perpendicular to each other so that in their static condition the disks contact each other at points spaced at the ends of their curvature.

The invention contemplates stacking the disks in groups and individually compressing the groups commencing with the center group and then the next group outwardly of the center group so that the stacks or groups are compressed in small increments.

A still further object of the invention is to so arrange the disks with respect to the shaft so that the disks will not rotate with respect thereto and at the same time the modulus of the elasticity of the entire roll assembly is not disturbed but is substantially constant throughout the entire circumferential extent of the roll.

To this end it is an object of the invention to provide a novel keying arrangement for interconnecting the disks with the shaft to accommodate substantially uniform transverse deflection of the roll about its entire periphery.

These and other objects of the invention will become more apparent from the specifications and the drawings, wherein:

FIGURE 3 is a side elevational view partially in axial section of a pair of rolls made in accordance with the invention;

Figure 7:
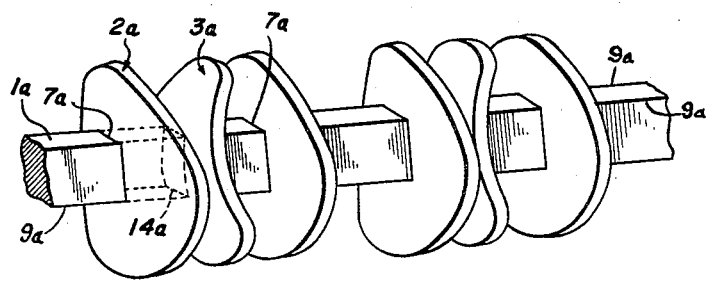
Figure 8:
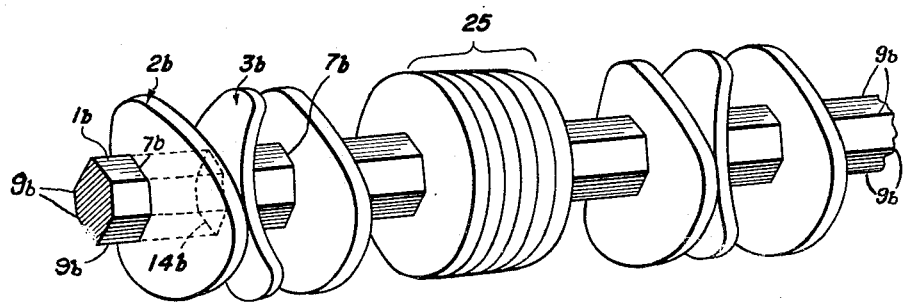

FIGURE 4 is an end view of one of the rolls;
FIGURE 5 is a perspective view of one of the disks;
FIGURE 6 is a perspective view of the other of the disks, and
FIGURES 7 and 8 are similar to FIGURES 1 and 2 illustrating different embodiments of the invention.

Figure 1:
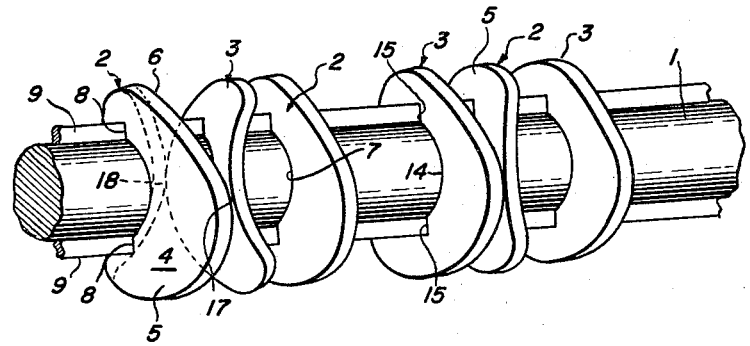
FIGURE 1 is a fragmentary perspective view of the roll assembly illustrating the first step in assembling the disks.
Figure 2:
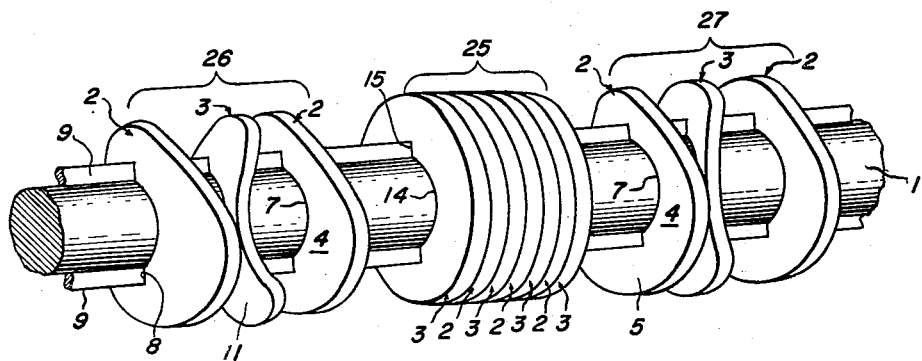
FIGURE 2 is a fragmentary perspective view similar to FIGURE 1 illustrating subsequent steps in assembling the roll.

Describing the invention in detail and having particular reference to FIGURES 1 through 6 there is shown a center shaft 1 on which there are sleeved the pairs of disks 2 and 3. It will be seen that the disk 2 comprises an annulus 4 and since it is formed of tire carcass material it is curved about the axis X—X (FIG. 5) and that it has a convex side 5 and a concave side 6 (FIG. 1). The disk 2 has a central aperture 7 and diametrically opposed keyways or grooves 8, 8 for reception of the loose keys 9, 9, the keys 9 being disposed at diametrically opposite sides of the shaft 2.

Each disk 3 is also made of tire carcass and is curved about the axis Y—Y (FIG. 6) and comprised the annulus 11 which has a convex side 12 and the concave side 13. Centrally thereof the disk 3 is provided with an aperture 14 for snug fit on the shaft 1 and at opposite sides of the opening 14 there is provided keyways or slots 15, 15 for reception of the keys 9, 9.

In observing the disks shown in FIGURES 5 and 6 it will be noted that the two disks are substantially identical except that they are oriented at substantially 90° with respect to each other.

I have found that heretofore in constructing rubber disk rolls the practice has been to cup the consecutive disks and after all of the disks have been placed on the shaft they were subjected to a compressive force at opposite ends in an attempt to compress the same and straighten out the disks so they assume a radial shape. In actual practice I have found that this has obtained unequal compression of the disks and that they would compress excessively at their initial points of contact and that they would be relatively loose at points of maximum curvature.

My method of making the rolls comprises the steps of alternating disks 2 and 3, that is, arranging the disks so that their axes of curvature are angularly related preferably at 90° to each other as shown in FIGURES 1 and 2 so that the diametrically opposite high point areas or ends of curvature at 17 and 18 of disk 2 contact the crest points 19 and 20 of the convex side 21a of disk 3. Similarly the end of high points 21 and 22 of disk 3 contact the diametrically opposite sides of the next succeeding disk at the crest points 23, 24 on the convex side 5 of the disk 2. Thus the axes of curvature of alternate disks are angularly related at approximately 90° to each other. The disks 2 and 3 are sleeved into the shaft on the keys 9 in alternating sequence in a first grouping 25 of a plurality of disks preferably about six or seven of such disks are compressed together at the medial portion of the shaft assembly and these disks are compressed under sufficient pressure to group them in face-to-face contact along substantially radial planes as shown in FIGURE 2. It will be seen that the disks are first placed as shown in FIGURE 1 and then they are grouped together and compressed at the center portion of the shaft preferably as shown in FIGURE 2. When the first group of disks are compressed the material flows radially and I have found that if sufficient pressure is exerted this group of disks on each succeeding group will substantially remain as shown in the grouping 25 even after the pressure is removed. The internal friction of the expanded material which reduces the size of the center apertures 7 and 14 as well as of the grooves 8 and 15 of the disks 2 and 3 forces the material into tight engagement with the shaft and the keys and the friction developed is sufficient to prevent the disks from separating. Following the initial grouping 25 other groupings 26 and 27 are formed at opposite sides of the grouping 25, the disks 2 and 3 being alternated and the disks of group 26 and 27 are then compressed against opposite ends of the group 25. Other groupings of disks such as 26 and 27 are continued at opposite ends of the groupings pressed on the shaft until the entire roll is built up, then the end caps 28 and 28 are sleeved over the ends of the shaft 1 and aligned with their apertures 30, 30 with the ends 31 of the keys. The end caps are then pressed toward each other pressing the entire roll assembly and the keys or pins 32 are passed through the openings 33 in the caps and through axially aligned openings in the respective ends of shaft 1. Thereafter the cotter keys 33' are extended through the openings 34' in the ends of the keys, the cotter keys being outwardly of the radial wall 35 of the end cap and being spaced outwardly therefrom whereby the keys are loosely held in place. However, the keys are interlocked with the caps against circumferential movement and the end caps are keyed by the pins 34 to the shaft whereby the shaft, keys and end cap form a shaft assembly which rotates in unison and the respective disks also rotate with the shaft assembly, the disks constituting the body portion of the roll. After the disks are applied then the roll is crowned by removing excess material as by grinding so that it is of maximum diameter at its center as at 37 and tapers toward opposite ends. This is accomplished by grinding off the periphery of the body portion of the roll and the taper is so chosen as to establish substantially uniform pressure contact with the associated roll 40 which is indicated at 41, the roll 40 being made up substantially exactly as the roll 42.

Referring now to the embodiment shown in FIGURES 7 and 8 it will be seen that in both of these embodiments the structures are substantially similar to that shown in the first embodiment and, therefore, identical parts are identified with corresponding reference numerals with the addition of a subscript. In the embodiment of FIGURE 7 shaft 1 has been substituted by the shaft 1-a and is of square configuration and therefore the openings 7-a and 14-a of disks 2-a and 3-a are made square. In the embodiment of FIGURE 8 the center shaft as identified 1-b is hexagonal and the openings 7-b and 14-b in disks 2-b and 3-b are also made hexagonal. Thus in these two embodiments of FIGURES 7 and 8 the keys 9 have been eliminated. However, the points 9-a in FIG. 7 and 9-b in FIG. 8 are the keying means and function the same as the keying means 9 in the previous embodiment. The shallow depth of 9-a and 9-b and the gradual change in section obviates the problems incidental to a weld key or large single or diametrical dual key designs of previous attempts.

What is claimed is:
1. A roll comprising a center support, key means associated with the support, a plurality of fiber impregnated disks of elastomer material mounted on the support and said disks having apertures complemental to said support and key means, said disks in their relaxed condition being axially curved and presenting a pair of end contact points at opposite ends of curvature at one side and having a convex crest at the opposite side, each disk disposed with its one side facing the opposite side of the next adjacent disk with said points thereof of each disk abutting against the crest of curvature of the succeeding disk except for the endmost disks, end caps abutting said endmost disks, and means holding said caps against said disks with said disks under axial compression said disks engaging each other under substantially uniform compression about their entire circumferential extent and developing a void-free periphery.

2. A roll comprising a center shaft, a plurality of annular disks sleeved thereon, each disk being of tire carcass resilient material and curved axially, said disks disposed in non-nesting abutting relationship with their axes of curvature angularly offset from each other circumferentially of the roll, and means holding said disks together on the shaft under axial compression of the order causing said disks to become flat and engage each other along substantially their entire opposing surfaces under substantially uniform compression about the entire circumstance of the roll and developing a void-free peripheral surface.

3. The invention according to claim 2 and said disks being of maximum diameter at the center of said roll body and progressively diminishing in diameter toward opposite ends of the body.

References Cited in the file of this patent

UNITED STATES PATENTS

| | | |
|---|---|---|
| 700,513 | Lange | May 20, 1902 |
| 861,888 | Perkins | July 31, 1907 |
| 1,317,713 | Linder | Oct. 7, 1919 |
| 1,591,897 | Vincke | July 6, 1926 |
| 2,247,874 | Crites | July 1, 1941 |
| 2,324,050 | Shelley | July 13, 1943 |
| 2,501,630 | Goulding | Mar. 21, 1950 |
| 2,720,692 | Lorig | Oct. 18, 1955 |